J. G. VINCENT.
MOTOR VEHICLE.
APPLICATION FILED SEPT. 16, 1916.

1,344,279.

Patented June 22, 1920.
2 SHEETS—SHEET 2.

Witness:
J. C. L. Blackmore

Inventor:
Jesse G. Vincent,
by Milton Tibbetts,
Atty.

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,344,279.  Specification of Letters Patent.  Patented June 22, 1920.

Application filed September 16, 1916. Serial No. 120,501.

*To all whom it may concern:*

Be it known that I, JESSE G. VINCENT, a citizen of the United States, and resident of Detroit, Wayne county, State of Michigan, have invented certain new and useful Improvements in Motor-Vehicles, of which the following is a specification.

This invention relates to motor vehicles and particularly to the water circulation system of the motor.

One of the objects of the invention is to simplify the piping of the water circulation system of a vehicle motor.

Another object of the invention is to provide a water jacketed intake pipe for a hydrocarbon motor whereby the gases passing to the motor are heated by the water passing from the cylinder jackets.

Another object of the invention is to provide a novel construction of intake pipe connecting the cylinder blocks of a V-type motor.

Other objects of the invention will appear from the following description taken in connection with the drawings which form a part of this specification, and in which.

Figure 1:
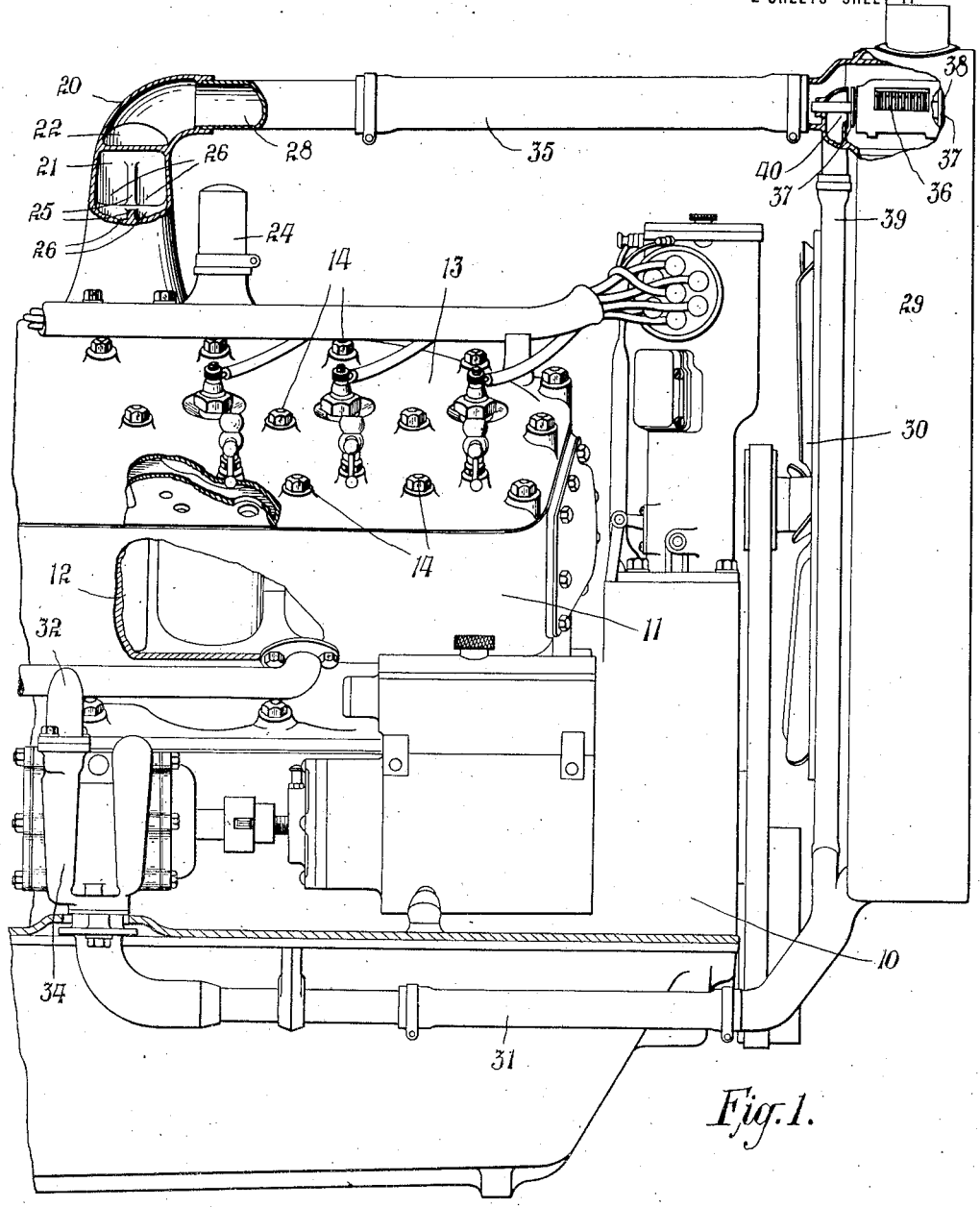
Figure 1 is a side elevation of the forward part of a hydrocarbon motor, together with the radiator and water circulation system as adapted to a motor vehicle, parts being broken away to show internal construction.
Figure 2:
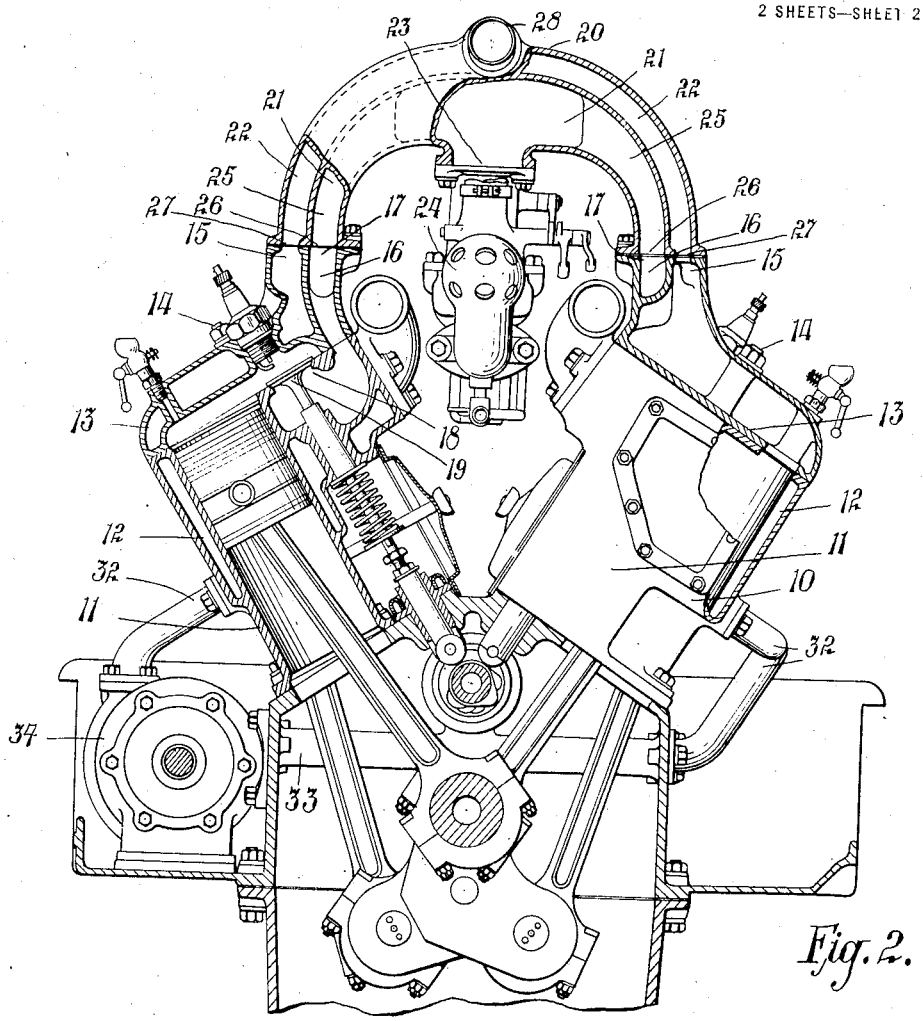
Fig. 2 is a transverse section and part elevation of the motor shown in Fig. 1.
Figure 3:
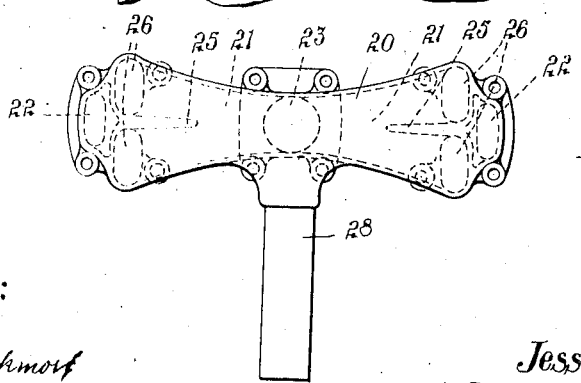
Fig. 3 is a plan view of the intake pipe illustrated in the other figures.

Referring to the drawings, 10 represents a hydrocarbon motor having two blocks of cylinders 11 arranged side by side. As shown, the motor is of the V-type and the cylinders are provided with the usual water jackets, 12. The cylinder bodies and their heads may be made integral if desired, but in the form shown the heads 13 are formed separately and secured to the cylinders as by bolts 14. The heads are also water jacketed and are formed with water outlets 15, adjacent the middle of the cylinder blocks. The heads and cylinder blocks are also cored to form intake passages 16 leading from a middle point as at 17 to the various intake ports 18 which are controlled by valves 19. It will be understood that there are two of these inlets 16 side by side adjacent the middle of each block and one of the passages 16 therefrom leads to the intake port in the forward half of the block, and the other passage 16 leads to the intake port in the rear half of the block. The intake passages 16 are of a peculiar curved construction a depression or pocket 16' being provided below each intake port 18 for the collection of the condensed fuel. As will appear from an examination of Fig. 2 these pockets are so formed that the condensed fuel will not impede the passage of the intake gases.

An intake pipe 20 of novel construction connects across from one cylinder block to the other. This intake pipe is of arched construction as shown and it is formed with two independent passages 21 and 22. The passage 21 is for the intake gases that enter the passage through an opening 23 at the middle of the pipe, the gases being supplied by a carbureter 24 suspended from the intake pipe between the cylinder blocks. This passage 21 extends lengthwise of the pipes to the ends thereof and it is bifurcated or divided by a wall 25, as it approaches the end of the pipe. Thus there are two outlets 26 at each end of the intake pipe, and these outlets are adapted to communicate with the inlets 16 hereinabove described. Thus the gases entering through the port 23 are divided by the partition 25 and pass through the outlets 26 into the passages 16 formed in the cylinder blocks.

The passage 22 is shown as outside of the passage 21 and it extends lengthwise of the intake pipe from an inlet 27 at each end of the pipe to a single outlet 28 at the middle of the pipe. The inlets 27 are in communication with the outlets 15 from the cylinder water jackets and the hot water from the cylinder jackets therefore passes through the passage 22 to the outlet 28 heating the intake pipe somewhat and therefore, vaporizing or assisting in vaporizing the gases in the passage 21.

At one end of the motor is a radiator 29 of any suitable form and a fan 30 driven by the motor is intended for increasing the circulation of air through the radiator. Between the lower part of the radiator 29 and the water jackets 12 of the cylinder blocks is a pipe 31. This pipe is branched at 32, one branch going to the right hand cylinder block and the other to the left hand cylinder block. The cross pipe is shown at 33 in Fig. 2.

Any suitable water circulation means such as a pump 34 is arranged in the pipe 31 so that the water may be drawn from the radiator 29 and forced into the cylinder water jackets.

A water connection 35 extends from the water outlet 28 of the intake pipe 20 to the upper part of the radiator 29, and a thermostat 36 is arranged in the upper part of the radiator or in this water connection to control the flow of water through the radiator. The thermostat 36 and the valve 37 which it controls may be of any desired form and as shown the thermostat operates the valve 37 to the right when it contracts and thereby closes the port 38 from the pipe 35 to the radiator. This causes the water from the pipe 35 to flow through a bypass 39 which leads downwardly to the pipe 31 at the lower part of the radiator. As the thermostat 36 expands it moves the valve 37 to the left and closes the opening 40 into the bypass 39 and opens the port 38 into the radiator.

By the above arrangement and location of the thermostatic valve, it will be seen that the flow of water through the radiator is controlled by the temperature of the water which has just left the water jackets of the motor and intake pipes, which is desirable in a motor of this type.

It will be understood that the water is circulated through the system by the pump 34 which draws the water from the radiator and forces it into the cylinder jackets where it is led through the passage 22 in the intake header 20 through the outlet 28 and the water connection or pipe 35 to the top of the radiator. Here it is either passed downwardly through the radiator or through the bypass 39 depending upon the temperature of the water at that point.

It will be further understood that other forms of the invention may be made without departing from the spirit or scope hereof.

Having thus described my invention, what I claim and desire to secure by Letters Patent is:—

1. In a motor vehicle, in combination, a motor comprising water jacketed cylinders in blocks side by side, a water jacketed intake pipe connected to the cylinder blocks, a radiator at the end of the motor, and a pipe leading from the jacket of the intake pipe to the radiator.

2. In a motor vehicle, in combination, a motor comprising water jacketed cylinders in blocks side by side, a water jacketed intake pipe connected to the cylinder blocks and having its jacket in communication with the jackets of the cylinder blocks, a radiator, a water connection from the radiator to the cylinder jackets, and a water connection from the intake pipe jacket to the radiator.

3. In a motor vehicle, in combination, a motor comprising water jacketed cylinders in blocks side by side, a water jacketed intake pipe connected to the cylinder blocks and having its jacket in communication with the jackets of the cylinder blocks, a radiator arranged upright at the end of the motor, piping leading from the lower part of the radiator to the cylinder jackets, a pump in said piping, and piping leading from the jacket of the intake pipe to the upper part of the radiator.

4. In a motor vehicle, in combination, a motor having water jacketed cylinder blocks side by side, an intake pipe arched from one cylinder block to the other and having a water jacket in communication with the water jackets of the cylinders, a radiator, and water connections from the intake pipe jacket to the radiator.

5. In a water circulation system for hydrocarbon motors, in combination, water jacketed cylinders, an intake pipe therefor, means for carrying the water from the cylinder jackets in proximity to the intake pipe to heat the latter, a radiator, a pipe and water circulating means between the radiator and the cylinder jackets, a passage from said intake pipe heating means to the radiator, and a thermostat in said passage adapted to control the flow of water through the radiator.

6. An intake pipe for a hydrocarbon motor comprising a passage for the intake gases extending from an intake opening at the middle toward both ends and forked at the outlet ends, and a passage for water having an intake opening at the ends of the pipe and an outlet at the middle thereof.

7. An intake pipe for a hydrocarbon motor, comprising an arched casting having two independent passages, one passage being for the intake gases and extending from an intake opening at the middle to outlets at the ends and the other passage being for water and extending from inlet openings at the ends to an outlet at the middle.

8. In a hydrocarbon motor, a cylinder, an intake valve in said cylinder, an intake manifold and a passage for the fuel gases connecting said valve with said manifold, said passage being provided with a pocket below said valve in which the condensed fuel collects out of the path of the gases.

9. In a hydrocarbon motor, a cylinder, an intake valve in said cylinder, an intake manifold and a passage for the fuel gases connecting said valve with said manifold and means for preventing the entrance of condensed fuel into the cylinder.

10. In a hydrocarbon motor, a cylinder, an intake valve in said cylinder, an intake manifold and a passage for the fuel gasses connecting said valve with said manifold, and means in said passage for preventing the entrance of condensed fuel into the cylinder.

11. An intake pipe for a hydrocarbon motor, comprising an arched casting having two independent passages, one passage being for the intake gases and extending from an intake opening at the middle to outlets at the ends, said outlets being divided and the other passage being for water and extending from inlet openings at the ends to an outlet at the middle, said water passage being disposed adjacent to said intake passage throughout the length of said intake passage.

In testimony whereof I affix my signature.

JESSE G. VINCENT.